US008365591B2

(12) United States Patent
Golly

(10) Patent No.: US 8,365,591 B2
(45) Date of Patent: Feb. 5, 2013

(54) STATIC PORT APPARATUS

(75) Inventor: Timothy T. Golly, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 149 days.

(21) Appl. No.: 12/946,192

(22) Filed: Nov. 15, 2010

(65) Prior Publication Data

US 2012/0118075 A1    May 17, 2012

(51) Int. Cl.
*A63B 53/00* (2006.01)
(52) U.S. Cl. .................................... 73/170.02
(58) Field of Classification Search ............... 73/861.42, 73/170.02
See application file for complete search history.

(56) References Cited

U.S. PATENT DOCUMENTS

| | | | |
|---|---|---|---|
| 3,020,003 A | 2/1962 | Frost et al. | |
| 3,520,184 A * | 7/1970 | Wohlfeld et al. | ............... 73/182 |
| 3,646,811 A | 3/1972 | De Leo et al. | |
| 4,096,744 A | 6/1978 | De Leo et al. | |
| 4,615,213 A | 10/1986 | Hagen | |
| 4,836,019 A | 6/1989 | Hagen et al. | |
| 5,442,958 A | 8/1995 | Hagen | |
| 5,657,946 A | 8/1997 | Perkins | |
| 5,731,507 A * | 3/1998 | Hagen et al. | ..................... 73/182 |
| 6,941,805 B2 * | 9/2005 | Seidel et al. | ............... 73/170.02 |
| 7,334,467 B1 * | 2/2008 | DuPuis et al. | ............. 73/170.02 |
| 7,407,136 B2 | 8/2008 | Murg | |
| 7,591,869 B2 * | 9/2009 | Jensen et al. | ..................... 55/396 |

FOREIGN PATENT DOCUMENTS

| | | |
|---|---|---|
| EP | 1255118 A1 | 11/2002 |
| EP | 1256812 A2 | 11/2002 |
| JP | 1149964 A | 6/1989 |
| WO | WO-9010492 A1 | 9/1990 |
| WO | WO-0020272 A1 | 4/2000 |

OTHER PUBLICATIONS

European Search Report from related EP Application No. 11250890 dated Feb. 21, 2012.
Pitot-static System search result from Wikipedia.org, accessed on Jul. 12, 2010.

* cited by examiner

*Primary Examiner* — Jewell V Thompson
(74) *Attorney, Agent, or Firm* — Edwards Wildman Palmer LLP; Scott D. Wofsy

(57) ABSTRACT

A static port apparatus for an aircraft having a static plate having inner and outer surfaces for fixture on the aircraft. The static plate including a first set of a plurality of port apertures and at least a second set of a plurality of port apertures. Each port aperture of the second set of port apertures is coaxially positioned with respect to each port aperture of the first set of port apertures.

23 Claims, 8 Drawing Sheets

STATIC PORT APPARATUS

FIELD OF THE INVENTION

The present invention relates to an air data for aircraft flight control, and more particularly, to a flush static plate having coaxially arranged static port apertures.

BACKGROUND OF THE INVENTION

A variety of air data measurement devices are known in the art for aircraft flight control. Of such devices, many are directed to measuring pitot pressure, static pressure, local angle of attack pressures, and angle of sideslip pressures as parameters for calculating pressure altitude, altitude rate, airspeed, Mach number, angle of attack, and angle of sideslip. These devices can also provide data for secondary purposes including engine control, artificial feel, cabin pressure differential, and more.

One such air data measurement device is a flush static plate which is used to sense the atmospheric pressure outside of the aircraft. Static pressure is an important parameter that is utilized in aircraft for numerous purposes including the determination of altitude, altitude rate, airspeed and airspeed rate, which last-mentioned parameters are, in turn, used as inputs to various other devices such as flight management systems, autopilots, ground proximity warning systems and wind shear detectors. The standard atmospheric pressure sensed by the static ports is used to generate altitude indicative signals which are provided, typically by the air data computer, to an altimeter in the cockpit of the aircraft. Pressures sensed by several static ports at different locations on an aircraft may also be used to calculate angle of attack, angle of sideslip, and total pressure therefore allowing for an all-flush air data system.

Air data systems comprised of conventional air data static plates, as shown in FIGS. 1 and 2, typically consist of several sets of co-located simplex static plates (FIG. 1) or several sets of static plates having multiple static port patterns (FIG. 2). However, multiple co-located static plates create an unnecessarily complex aircraft installation. With regards to static plates having multiple static port patterns, they typically require large, expensive static plates since the port patterns are spaced apart (e.g., 1 to 14 inches) in linear or circular arrangements. Additionally, static plates configured to have small distances between static port patterns are difficult to heat adequately since nearly all of the volume near the center of the static plate is consumed by static ports and their associated moisture traps. Still further, it is difficult to package related electronics and sensors with closely spaced static port patterns. It is also to be appreciated that with either the aforesaid co-located simplex static plates (FIG. 1) or several sets of static plates having multiple static port patterns (FIG. 2), measured air pressure at each port pattern varies one from another compromising the accuracy of the static pressure measuring system while increasing the difficulty in determining a failure from a static port pattern.

SUMMARY OF THE INVENTION

In one aspect of the invention, and in accordance with an illustrated embodiment, is a static port apparatus for an aircraft including a flush static plate having inner and outer surfaces for fixture on the aircraft. The flush static plate including a first set of a plurality of port apertures and at least a second set of a plurality of port apertures wherein each port aperture of the second set of port apertures is coaxially positioned with respect to each port aperture of the first set of port apertures. In a further aspect of the invention, the flush static plate of the static port apparatus further includes a third set of port apertures wherein each port aperture of the third set of port apertures is coaxially positioned with respect to each port aperture of the first and second set of port apertures.

Further, the foregoing static port apparatus includes a manifold assembly affixed to the inner surface of the flush static plate that channels airflow from each port aperture of the first and second set of port apertures into respective first and second output ports. In another aspect of the invention, the manifold assembly includes a first manifold apparatus defining a first channel that communicates with each port aperture of the first set of port apertures wherein the first channel is in communication with the first output port such that airflow that enters each aperture port of the first set of port apertures is directed into the first output port. The manifold assembly also including a second manifold apparatus configured to fit atop the first manifold apparatus, the second manifold apparatus defining a second channel that communicates with each port aperture of the second set of port apertures wherein the second channel is in communication with the second output port such that airflow that enters each aperture port of the second set of port apertures is directed into the second output port.

Another aspect of the invention can include the inner surface of the flush static plate defining a first formed portion which cooperates with the first manifold apparatus to direct airflow to the first output port and a second formed portion which cooperates with the second manifold apparatus to direct airflow to the second output port.

An embodiment of the invention can implement one or more of these optional aspects.

BRIEF DESCRIPTION OF THE DRAWINGS

The objects and features of the invention can be understood with reference to the following detailed description of an illustrative embodiment of the present invention taken together in conjunction with the accompanying drawings in which.

WRITTEN DESCRIPTION OF CERTAIN EMBODIMENTS OF THE INVENTION

The present invention is now described more fully with reference to the accompanying drawings, in which an illustrated embodiment of the present invention is shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

The subject invention, and as discussed below with reference to the illustrated embodiments, is directed to a new and useful static port apparatus for measuring air pressure having port patterns for a plurality of air pressure sensors wherein the port patterns are coaxial with respect to one another, as described further below. As will become apparent from the below description, coaxially located ports for a plurality of air pressure sensors is advantageous because it saves space, reduces weight, reduces the energy required for anti-icing purposes, and pressure measurements for a plurality of air pressure sensor are measure from a common location providing substantially identical measurements, which significantly simplifies transducer failure detection amongst other advantages as mentioned further below.

Figure 1:
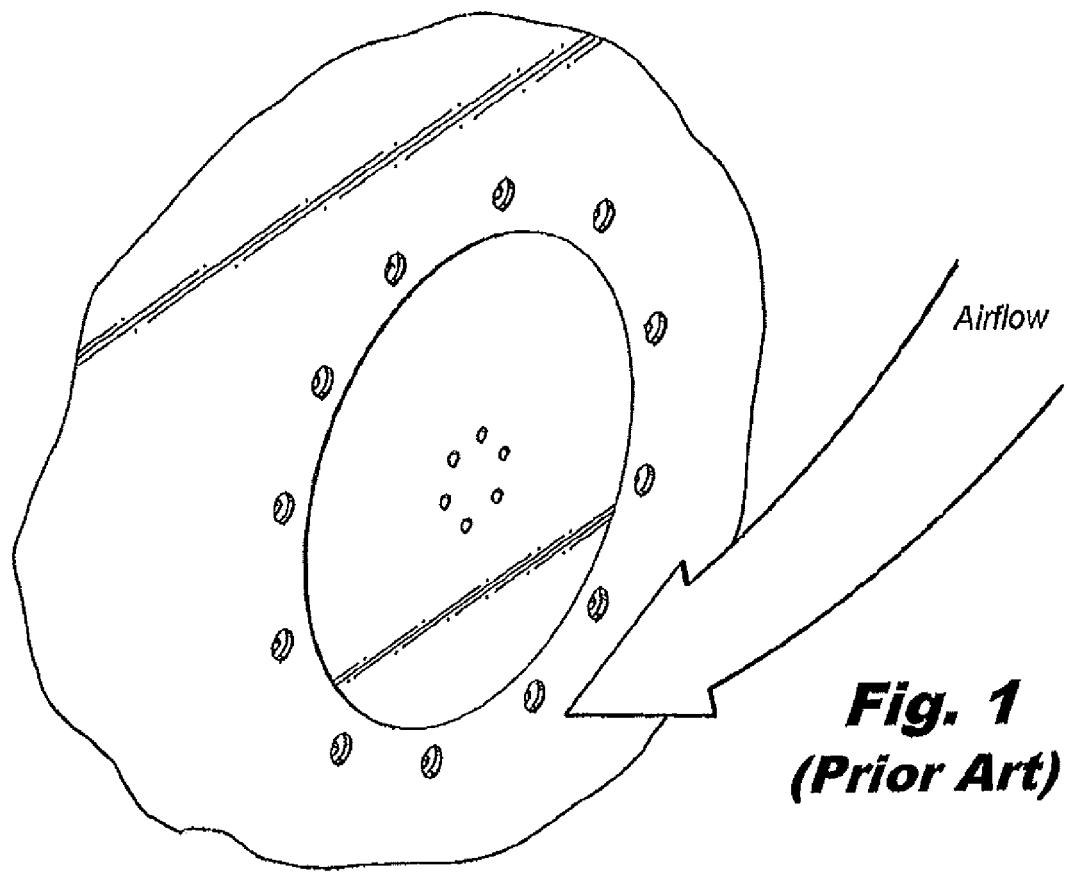
FIGS. 1 and 2 illustrate prior art static port apparatus'.
Figure 2:
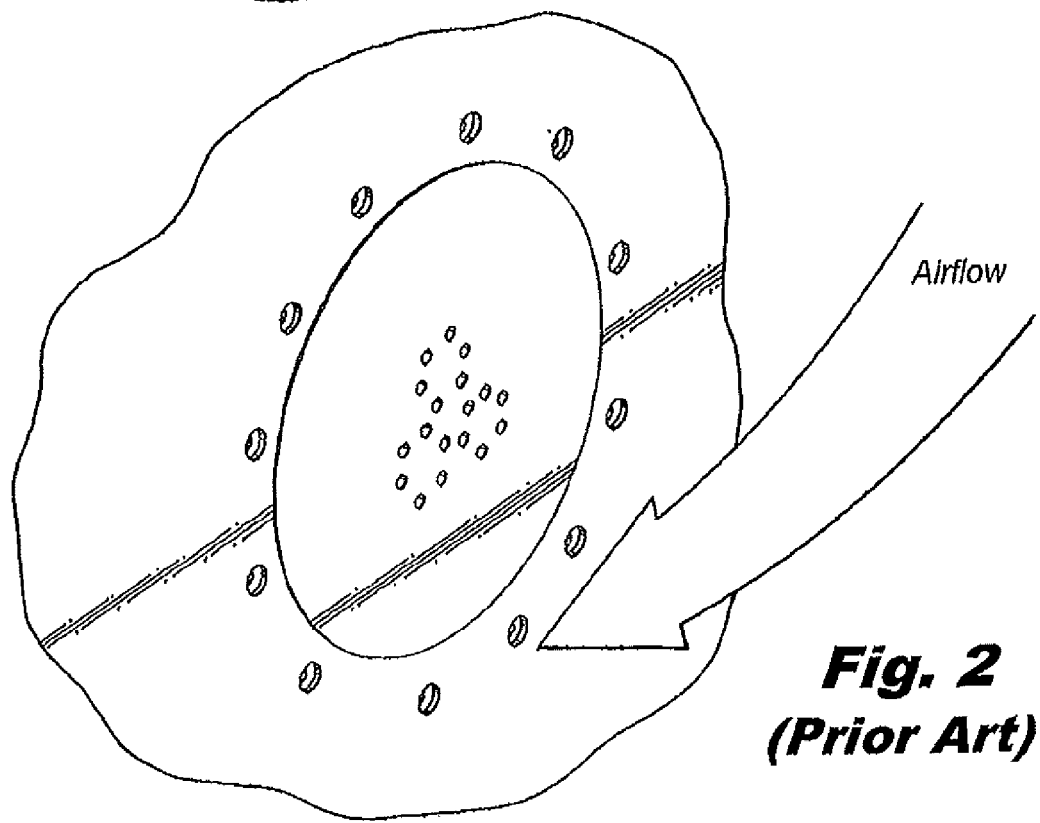
Figure 3:
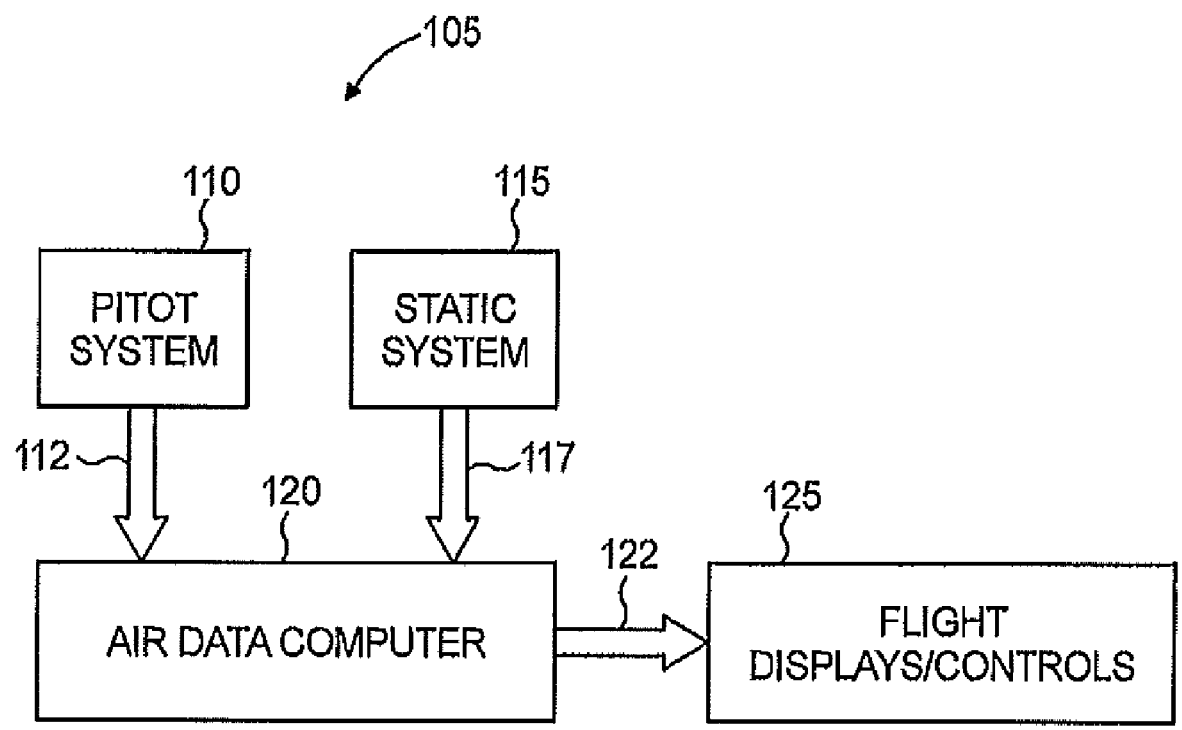
FIG. 3 depicts a block diagram of an avionics system compatible for use with the present invention static port apparatus in accordance with the illustrated embodiments.

With reference now to the illustrated embodiment of FIG. 3, shown is a block diagram of avionics system 100 adapted to provide pitot-static monitoring in accordance with the illustrated embodiments of the present invention and is provided to shown an exemplary operating environment for the invention. System 100 utilizes numerous conventional components of avionics systems, which are adapted to implement the methods of the present invention. System 100 includes pitot-static system 105 coupled to an air data computer 120 which is coupled to a flight displays/controls 125. It is to be appreciated that the embodiment of avionics system 100 shown in FIG. 1 is provided for illustrative purposes only and it is not to be understood to be limited thereto. For instance, it is to be understood and appreciated pitot-static system 105 may include any number and combination of pitot 110 and static 115 probe components.

As discussed further below in accordance with illustrated embodiments of the invention, static system 115 preferably includes static pressure ports which sense the atmospheric pressure outside of the aircraft. Static system 115 provides output 117 to air data computer 120 which is typically indicative of the altitude of the aircraft. Output 117 of static system 115 can include pressure, electrical signals, or other outputs indicative of the pressures sensed by static system 115 or of the altitude of the aircraft. While output 117 of static system 115 is illustrated as being coupled to an air data computer 120, in other embodiments, these outputs may also be provided directly to altimeters and air speed indicators. In the embodiment illustrated, air data computer 120 provides air speed and altitude data 122 to flight displays/controls 125. Flight displays/controls 125 typically display to the pilot of the aircraft the altitude and air speed information. Also, flight displays/controls 125 can automatically control aspects of the aircraft operation based upon the air speed and altitude data 122.

Figure 4:
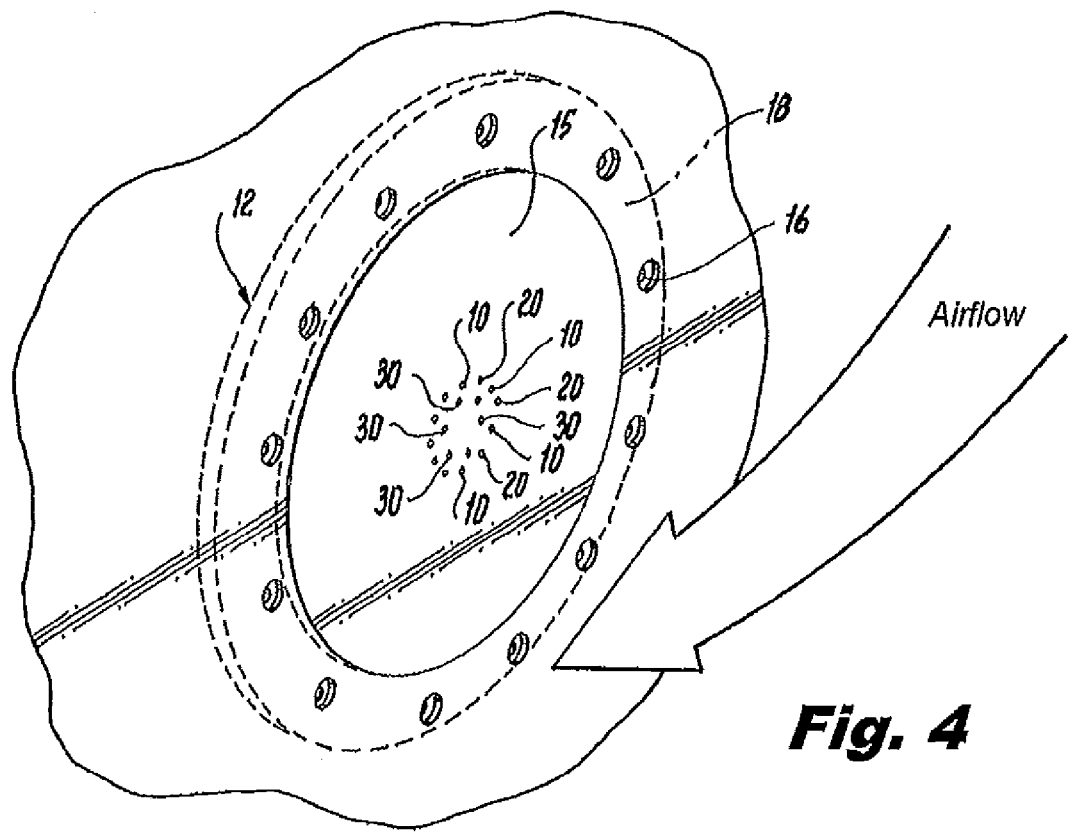
FIG. 4 depicts an outer surface of a static port apparatus in accordance with the illustrated embodiments of the invention.
Figure 5:
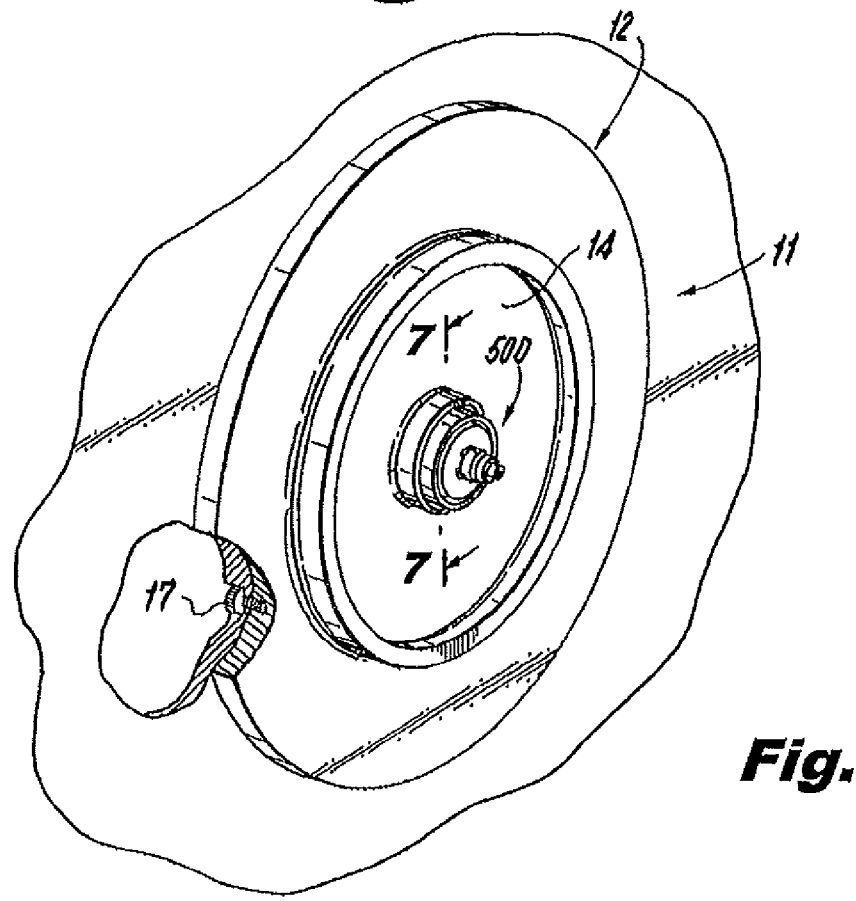
FIG. 5 depicts an inner surface of a static port apparatus illustrated in FIG. 4.

With reference now to FIGS. 4 and 5, shown is a static port apparatus in accordance with an illustrated embodiment if the invention, designated generally by reference numeral 12. Static port apparatus 12 is configured and operable to be mounted on the fuselage portion of an aircraft 11 wherein an outer surface 15 of static port apparatus 12 is preferably mounted to be substantially flush with the exterior fuselage portion of an aircraft preferably via fasteners 17 (FIG. 5) which extend through fastener apertures 16 formed in mounting flange 18 preferably affixed flush against an interior surface of the aforesaid fuselage. It is to be understood and appreciated, static port apparatus 12 may be fabricated from any material, or combination of materials, suitable for its intended purpose.

With continuing reference to the illustrated embodiment of FIGS. 4 and 5, static port apparatus 12 is shown to define a first, second and third set of port apertures wherein each aperture in the first set of port apertures is designated by reference numeral 10, each aperture in the second set of port apertures is designated by reference numeral 20 and each aperture in the third set of port apertures is designated by reference numeral 30. As will be described and appreciated below, each set of port apertures (10, 20 and 30) connects to a respective pressure sensor $S_1$, $S_2$, and $S_3$ preferably provided in the air data computer 120, via a manifold assembly 500, for providing air pressure measurements thereto. In the illustrated embodiment shown in FIGS. 4 and 5, each set of port apertures (10, 20 and 30) is shown to include six discrete apertures, which is to be understood to be provided for illustrative purposes only as set a port apertures may include any number of apertures contingent upon a host of design and/or functionality factors. Likewise, the static port apparatus 12 is shown in the illustrated embodiment of FIG. 4 to include three sets of port apertures (10, 20 and 30) which is also to be understood to be provided for illustrative purposes only as static port apparatus 12 may include any integral number of port aperture sets.

As shown in the illustrated embodiment of FIG. 4, each aperture in each set of port apertures (10, 20 and 30) is preferably coaxially located with respect to one another on the outer surface 15 of static port apparatus 12. As illustrated, each coaxially positioned port aperture of the first and second set of port apertures 10, 20 is provided along a common diameter defined on the other surface 15 of static port apparatus 12 while each port aperture of the third set of port apertures 30 is provided along a diameter defined on the outer surface 15 of static port apparatus 12 which is preferably less than the aforesaid diameter defined by the first and second set of port apertures 10, 20.

Figure 6:
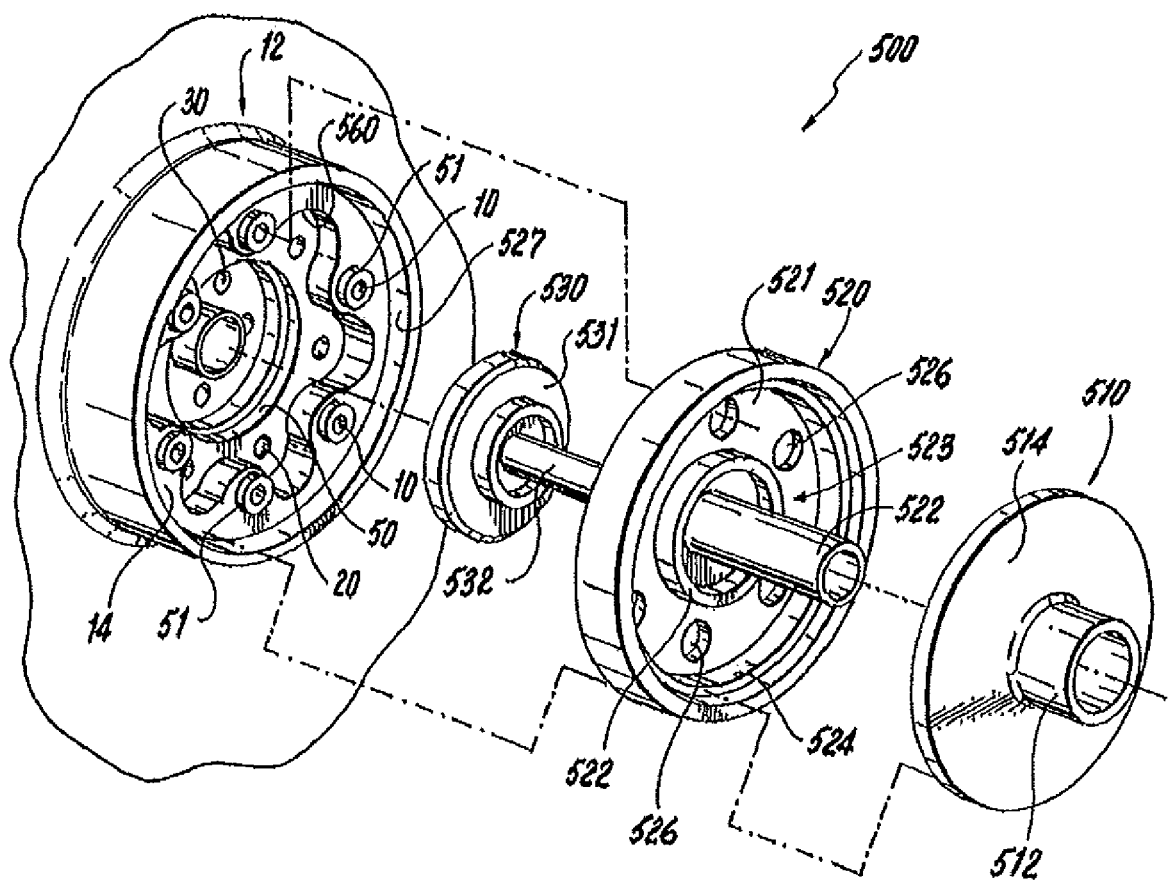
FIG. 6 depicts an exploded view of the inner surface of a static port apparatus illustrated in FIG. 4.

With reference now to FIGS. 5 and 6, shown in accordance with the illustrated embodiment is the inner surface portion 14 of the static port apparatus 12 facing inward relative to the fuselage of an aircraft. Also shown in exploded view is a manifold assembly, designated generally by reference numeral 500, configured to affix to the inner surface portion 14 of the static port apparatus 12. As described further below, manifold assembly 500 is configured and operative to cooperate with each port aperture set (10, 20 and 30) defined on static port apparatus 12 so as to channel airflow from each port aperture of the first, second and third set of port apertures (10, 20 and 30) into respective first, second and third output ports (512, 522 and 532), each preferably coaxially disposed with respect to one another, as also described further below.

Figure 7:
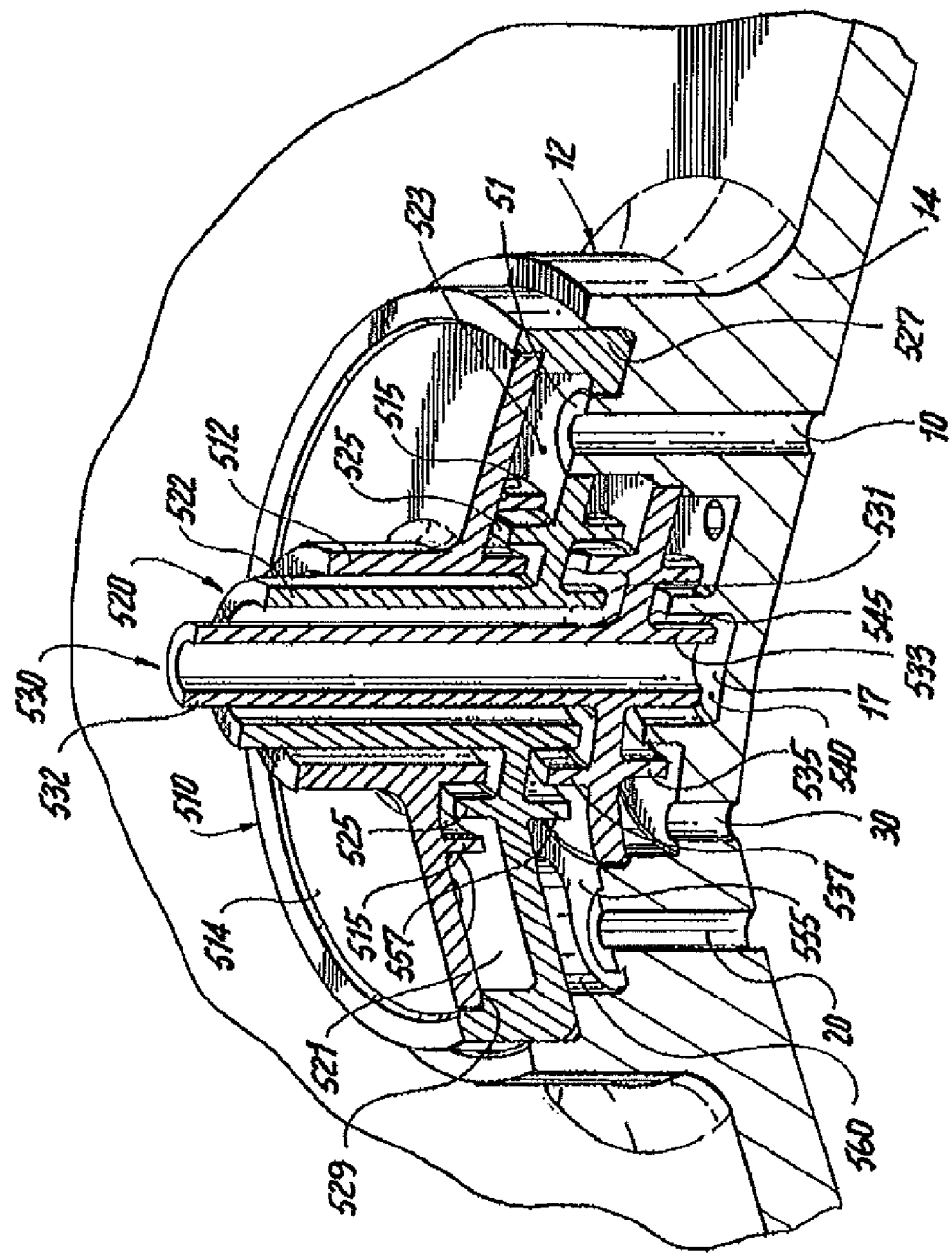
FIG. 7 depicts a cross-sectional view taken along line 7-7 of FIG. 5.

With reference now to FIGS. 6-7, the manifold assembly 500 includes a first manifold member 510, a second manifold member 520 and a third manifold member 530 which are each configured and operable to fit with one another, as described below. As also described below, the manifold assembly 500 is configured and operable to affix to the inner surface 14 of the static port apparatus 12 so as to channel airflow from each respective set of port apertures 10, 20 and 30 into the respective first, second and third output ports 512, 522 and 532. It is to be understood and appreciated the manifold assembly 500 may affix to the inner surface of the static port apparatus using any suitable affixation means including, but not limited to welding, brazing, or adhesive bonding.

The first manifold member 510 includes a first output port 512 preferably extending from a planar disc base portion 514. As described below, the first manifold member 510 is configured and operable to cooperate with the below described second manifold member 520 to channel airflow from each port of the first set of port apertures into the first output port 512 of the first manifold member 510.

The second manifold member 520 includes a second output port 522 extending from a planar disc portion 521. An airflow region 523 is defined by the second manifold member 510 between an inner upstanding annular wall 525 and an outer annular wall 527. It is to be appreciated and understood annular upstanding wall 525 also defines a moisture trap for each aperture of the first set of aperture ports 10 functional to prevent moisture from entering the first output port 512. The planar disc portion 521 of the second manifold member 520 includes a same number of apertures 526 to the number of apertures provided in the first set of port apertures 10 such that an aperture projection member 51 upstanding from each aperture provided in the first set of apertures 10 formed on the inner surface 14 of port apparatus 12 slideably receives into a respective aperture 526 formed in the planar disc portion 521 of the second manifold member 520.

Figure 8:
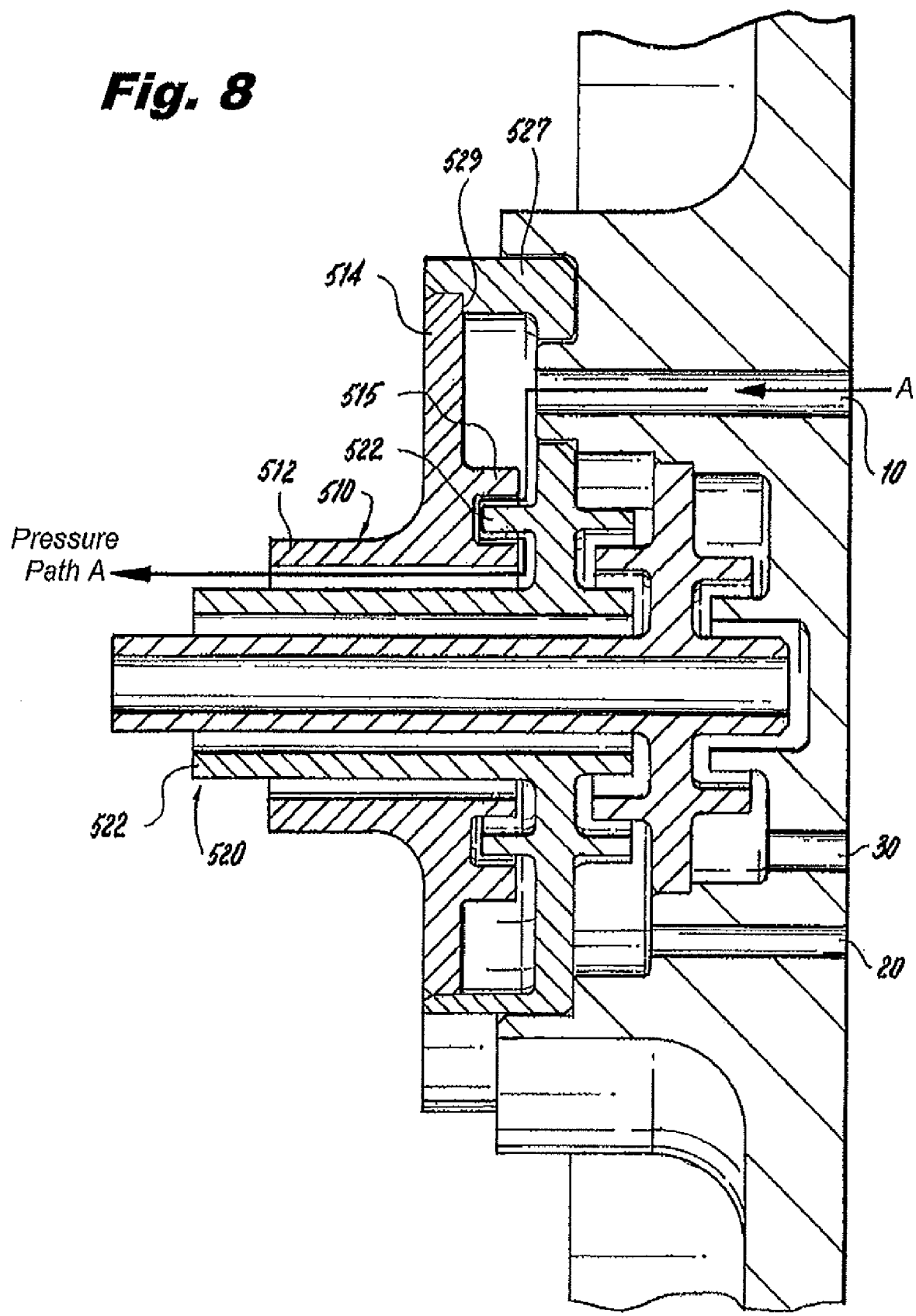
FIG. 8 depicts a cross-sectional view of the static port apparatus of FIG. 4 illustrating air flow path "A" for the apertures of a first set of aperture ports.

With reference now to FIGS. 7 and 8, the outer annular wall 527 of the second manifold member 520 defines a lip portion 529 dimensioned and configured such that the outer periphery of the planar disc portion 514 of the first manifold member 510 rests upon the lip portion 529 of the second manifold member 520 when the first manifold member 510 is fitted atop the second manifold member 520. The first manifold member 510 is provided with an annular air channel member 515 extending downward from the planar disc portion 514 such that when the first manifold member 510 is fitted atop the second manifold member 520, an air path indicated by arrow "A" is defined between the first and second manifold members 510 and 520.

Figure 9:
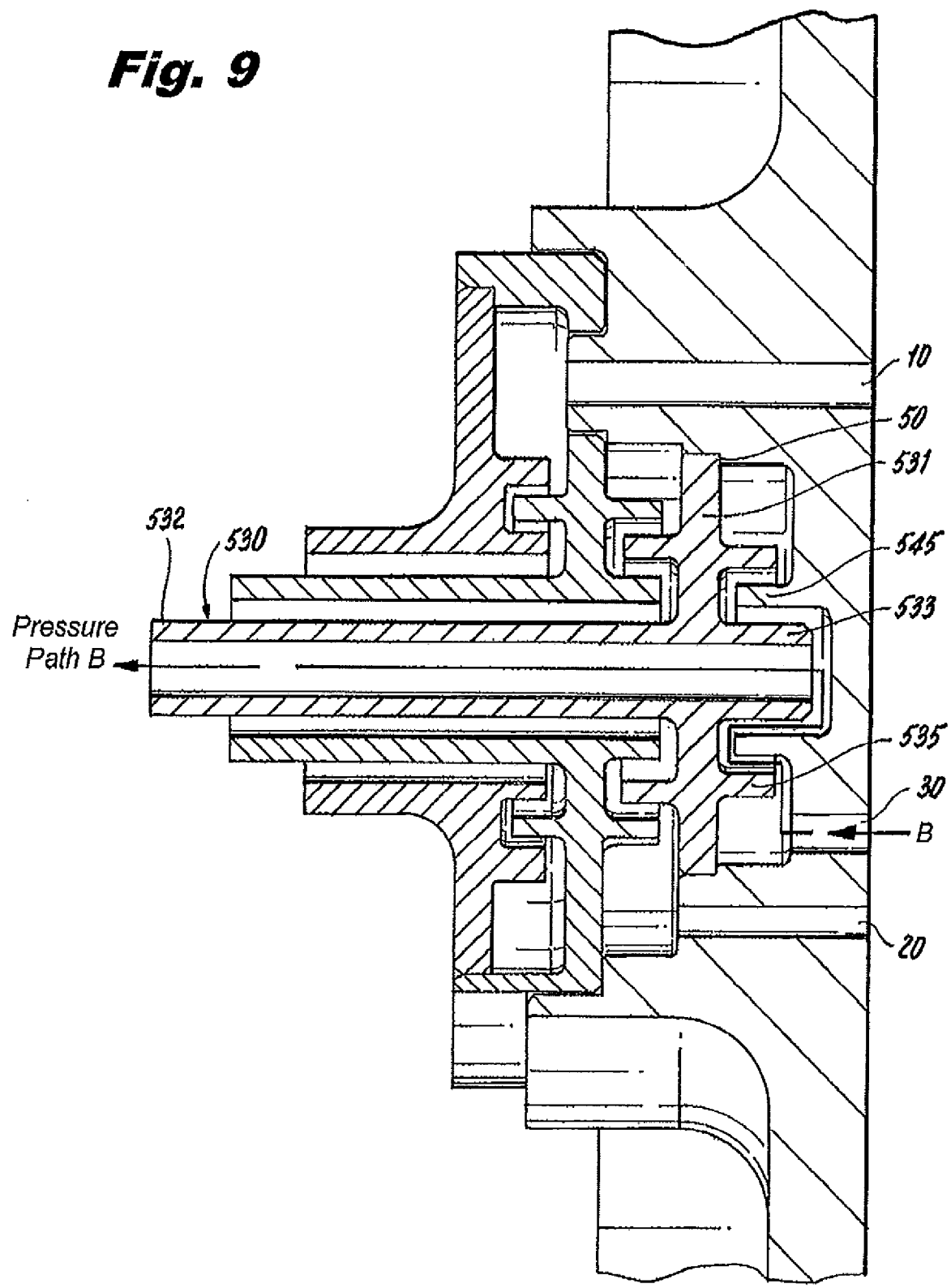
FIG. 9 depicts a cross-sectional view of the static port apparatus of FIG. 4 illustrating air flow path "B" for the apertures of a third set of aperture ports.

With returning reference to FIGS. 6 and 7, the third manifold member 530 includes a third output port 532 extending from a planar disc portion 531. Planar disc portion 531 is dimensioned and configured to sit atop a lip 50 defined on the inner surface portion 14 of static port apparatus 12. Relative to FIG. 7, a bottom tubular portion 533 of the third output port 532 extends toward an air channel region 540 defined by an annular wall 545 upstanding on the inner surface portion 14 of static apparatus 12, which bottom portion 533 of the third output port 532 terminates at a spaced distance from a bottom surface 17 on the inner surface portion 14 of static port apparatus 12. It is to be appreciated and understood that annular upstanding wall 545 defines a moisture trap for each aperture of the third set of aperture ports 30 functional to prevent moisture from entering the third output port 532. The third manifold member 530 is provided with an first annular air channel member 535 extending downward from the planar disc portion 531 such that when the third manifold member 530 is fitted atop the lip portion 50 defined on the inner surface portion 14 of static port apparatus 12, an air path indicated by arrow "B" is defined between inner surface portion 14 of static port apparatus 12 and the third manifold member 530, as shown in FIG. 9.

Figure 10:
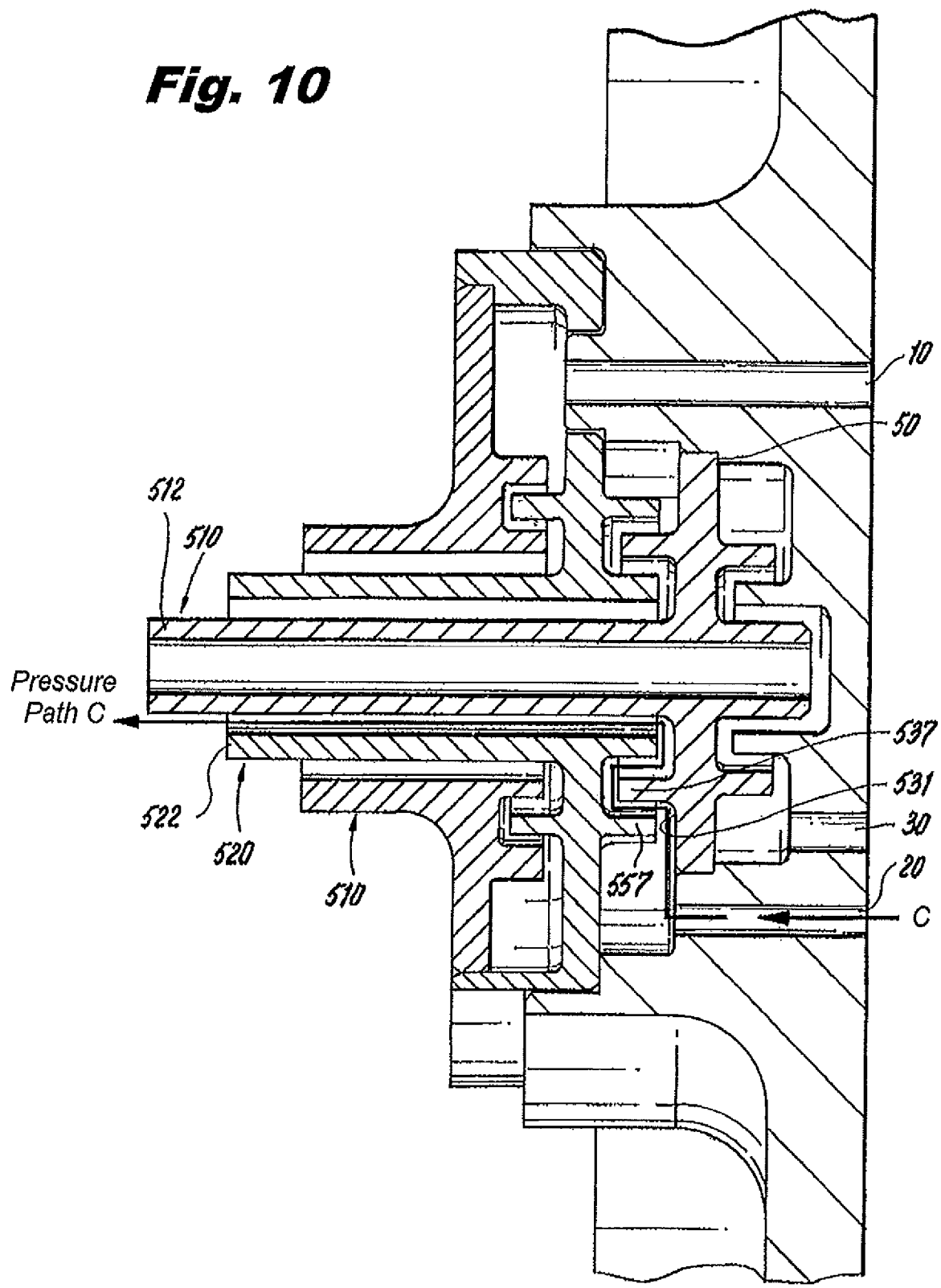
FIG. 10 depicts a cross-sectional view of the static port apparatus of FIG. 4 illustrating air flow path "C" for the apertures of a second set of aperture ports.

With returning reference to FIGS. 6 and 7, an airflow region 555 for the second set of port apertures 20 is defined between the second and third manifold members 520 and 530, and particularly by the second manifold member 520 between an inner downward extending annular wall 557 formed on the second manifold member 520 and an outer annular wall 560 defined in the inner surface portion 14 of static port apparatus 12. Each aperture of the second set of port apertures 20 is in air flow communication with airflow region 555. The third manifold member 530 is further provided with a second annular air channel member 537 extending upward from the planar disc portion 531. It is to be appreciated and understood annular wall 537 defines a moisture trap for each aperture of the second set of aperture ports 20 functional to prevent moisture from entering the second output port 522. Further, annular upstanding wall 537 is configured and dimensioned such that when the third manifold member 530 is fitted atop the lip portion 50 defined on the inner surface portion 14 of static port apparatus 12, and the second manifold member 520 is fitted atop the third manifold member 530, an air path indicated by arrow "C" is defined between the second 520 and third manifold members 530, as shown in FIG. 10. Therefore, it is to be appreciated and understood that the above described manifold assembly 500 is configured and operative to channel air flow from each aperture of each of port aperture set (e.g., 10, 20, and 30) into a respective output port (e.g., 512, 522, 532) wherein each output port (e.g., 512, 522, 532) is coaxially positioned with respect to one another, and likewise, each aperture of each of port aperture set (e.g., 10, 20, and 30) is coaxially positioned with respect to one another. As shown in FIG. 7, each output port (e.g., 512, 522, 532) is slideably received at a spaced distance relative to one another to provide the air flow paths "A, B and C" as shown in FIGS. 8-10. It is also to be appreciated and understood that each coaxially positioned output port (e.g., 512, 522, 532) connects to a respective air pressure sensor $S_1$, $S_2$, and $S_3$ (not shown) preferably provided in the air data computer 120. Still further, it is to be appreciated and understood, that in accordance with the illustrated embodiments of the invention, a single heating unit is used for static port apparatus 12 for providing heat to each aperture of each set of aperture ports (e.g., 10, 20 and 30) and their associated moisture traps for preventing ice blockages therein.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the scope of the present invention.

What is claimed is:

1. A static port apparatus for an aircraft comprising:
   a static plate having inner and outer surfaces for fixture on the aircraft, the static plate including;
   a first set of a plurality of port apertures; and
   at least a second set of a plurality of port apertures wherein each port aperture of the second set of port apertures is coaxially positioned with respect to each port aperture of the first set of port apertures.

2. A static port apparatus as recited in claim 1 further including a third set of port apertures wherein each port aperture of the third set of port apertures is coaxially positioned with respect to each port aperture of the first and second set of port apertures.

3. A static port apparatus as recited in claim 1 wherein each coaxially positioned port aperture of the first and second set of port apertures is positioned radially around a common center point on the static plate.

4. A static port apparatus as recited in claim 3 wherein each coaxially positioned port aperture of the first and second set of port apertures is positioned along a common diameter defined on the static plate.

5. A static port apparatus as recited in claim 4 further including a third set of port apertures wherein each port aperture of the third set of port apertures is coaxially positioned with respect to each port aperture of the first and second set of port apertures.

6. A static port apparatus as recited in claim 5 wherein each port aperture of the third set of port apertures is positioned along a diameter on the static plate different than the diameter including the first and second set of port apertures.

7. A static port apparatus as recited in claim 1 further including a manifold assembly affixed to the inner surface of the static plate that channels airflow from each port aperture of the first and second set of port apertures into respective first and second output ports.

8. A static port apparatus as recited in claim 7 wherein each first and second output port is coaxially positioned relative to one another.

9. A static port apparatus as recited in claim 8 wherein the manifold assembly includes a first manifold member defining a first channel that communicates with each port aperture of the first set of port apertures wherein the first channel is in communication with the first output port such that airflow that enters each aperture port of the first set of port apertures is directed into the first output port.

10. A static port apparatus as recited in claim 9 wherein the inner surface of the static plate defines a first formed portion which cooperates with the first channel to direct airflow to the first output port.

11. A static port apparatus as recited in claim 9 wherein the manifold assembly further includes a second manifold member configured to fit atop the first manifold member, the second manifold member defining a second channel that communicates with each port aperture of the second set of port apertures wherein the second channel is in communication with the second output port such that airflow that enters each aperture port of the second set of port apertures is directed into the second output port.

12. A static port apparatus as recited in claim 11 wherein the inner surface of the static plate defines a second formed portion which cooperates with the second channel to direct airflow to the second output port.

13. A static port apparatus as recited in claim 6 further including a manifold assembly affixed to the inner surface of the static plate that channels airflow from each port aperture of the first, second and third set of port apertures into respective first, second and third output ports wherein each first, second and third output port is coaxial relative to one another.

14. A static port apparatus as recited in claim 13 wherein the manifold assembly further includes a heating unit coupled to the inner surface of the static plate to prevent airflow blockage of the first, second and third output ports due to icing.

15. A static port apparatus for an aircraft comprising:
a static plate having inner and outer surfaces for fixture on the aircraft, the static plate including;
a first set of a plurality of port apertures; and
at least a second set of a plurality of port apertures; and
a manifold assembly affixed to the inner surface of the static plate that channels airflow from each port aperture of the first and second set of port apertures into respective first and second output ports.

16. A static port apparatus as recited in claim 15 wherein each first and second output port is coaxially positioned relative to one another.

17. A static port apparatus as recited in claim 16 wherein each port aperture of the second set of port apertures is coaxially positioned with respect to each port aperture of the first set of port apertures.

18. A static port apparatus as recited in claim 15 further including a third set of port apertures wherein the manifold assembly channels airflow from each port aperture of the first, second and third set of port apertures into a respective first, second and third coaxially positioned output port.

19. A static port apparatus as recited in claim 16 wherein the manifold assembly includes:
a first manifold member defining a first channel that communicates with each port aperture of the first set of port apertures which first channel is in communication with the first output port such that airflow that enters each aperture port of the first set of port apertures is directed into the first output port; and
a second manifold member configured to fit atop the first manifold member, the second manifold apparatus defining a second channel that communicates with each port aperture of the second set of port apertures which second channel is in communication with the second output port such that airflow that enters each aperture port of the second set of port apertures is directed into the second output port.

20. A static port apparatus as recited in claim 19 wherein the inner surface of the static plate defines:
a first formed portion which cooperates with the first manifold member to direct airflow to the first output port; and
a second formed portion which cooperates with the second manifold member to direct airflow to the second output port.

21. A static port assembly for an aircraft comprising:
a static plate configured to be mounted on an aircraft outer mold line, the static plate having inner and outer surfaces wherein the inner surface is configured to be mounted so as to face inwards towards the aircraft, the outer surface is configured to be mounted flush with the aircraft outer mold line, and the static plate including;
a first set of a plurality of port apertures; and
at least a second set of a plurality of port apertures wherein each port aperture of the second set of port apertures is coaxially positioned with respect to each port aperture of the first set of port apertures; and
a manifold assembly affixed to the inner surface of the static plate that channels airflow from each port aperture of the first and second set of port apertures into respective first and second coaxially positioned output ports.

22. A static port apparatus as recited in claim 21 wherein the manifold assembly includes:
a first manifold member defining a first channel that communicates with each port aperture of the first set of port apertures which first channel is in communication with the first output port such that airflow which enters each aperture port of the first set of port apertures is directed into the first output port; and
a second manifold member configured to fit atop the first manifold member, the second manifold member defining a second channel that communicates with each port aperture of the second set of port apertures which second channel is in communication with the second output port such that airflow which enters each aperture port of the second set of port apertures is directed into the second output port.

23. A static port assembly as recited in claim 22 wherein the inner surface of the static plate defines:
a first formed portion which cooperates with the first channel to direct airflow to the first output port; and
a second formed portion which cooperates with the second channel to direct airflow to the second output port.

* * * * *